United States Patent [19]
Zitting

[11] Patent Number: 5,940,408
[45] Date of Patent: Aug. 17, 1999

[54] USE OF REDUNDANT BITS OF ESF DATA STREAM TO TRANSPORT MESSAGE-WAITING SIGNALLING OVER FXO/FXS T-1 DIGITAL LINK

[75] Inventor: Brent R. Zitting, Harvest, Ala.

[73] Assignee: Adtran, Inc., Huntsville, Ala.

[21] Appl. No.: 08/691,839

[22] Filed: Aug. 1, 1996

[51] Int. Cl.$^6$ ........................................ H04J 3/12
[52] U.S. Cl. ........................................ 370/523; 379/231
[58] Field of Search ................. 370/522, 523, 370/524, 527, 528, 529, 470; 379/231, 252, 382, 399, 229, 88, 89

[56] References Cited

U.S. PATENT DOCUMENTS

| | | | |
|---|---|---|---|
| 4,730,312 | 3/1988 | Johnson et al. .................. | 370/523 |
| 4,901,344 | 2/1990 | Monette et al. .................. | 370/528 |
| 5,197,068 | 3/1993 | Holien et al. .................... | 370/527 |
| 5,224,108 | 6/1993 | McDysan et al. ................. | 370/522 |
| 5,408,524 | 4/1995 | Reum .............................. | 370/523 |

*Primary Examiner*—Chau Nguyen
*Attorney, Agent, or Firm*—Charles E. Wands

[57] ABSTRACT

Controlled activation of a message-waiting light of a telephone unit of a PBX system, that is coupled over a two-wire link to a foreign exchange subscriber circuit terminating a digital communication link, is carried out by hardware and software modifications to each of FXO and FXS channel units at opposite ends of the digital communication link. These modifications are effective to rob redundant signalling bits of extended superframe format time division multiplexed digital communication signals to transport a prescribed request code, that instructs the FXS circuit to generate a message-waiting light driving signal on the tip-ring pair to the message-waiting phone.

17 Claims, 2 Drawing Sheets

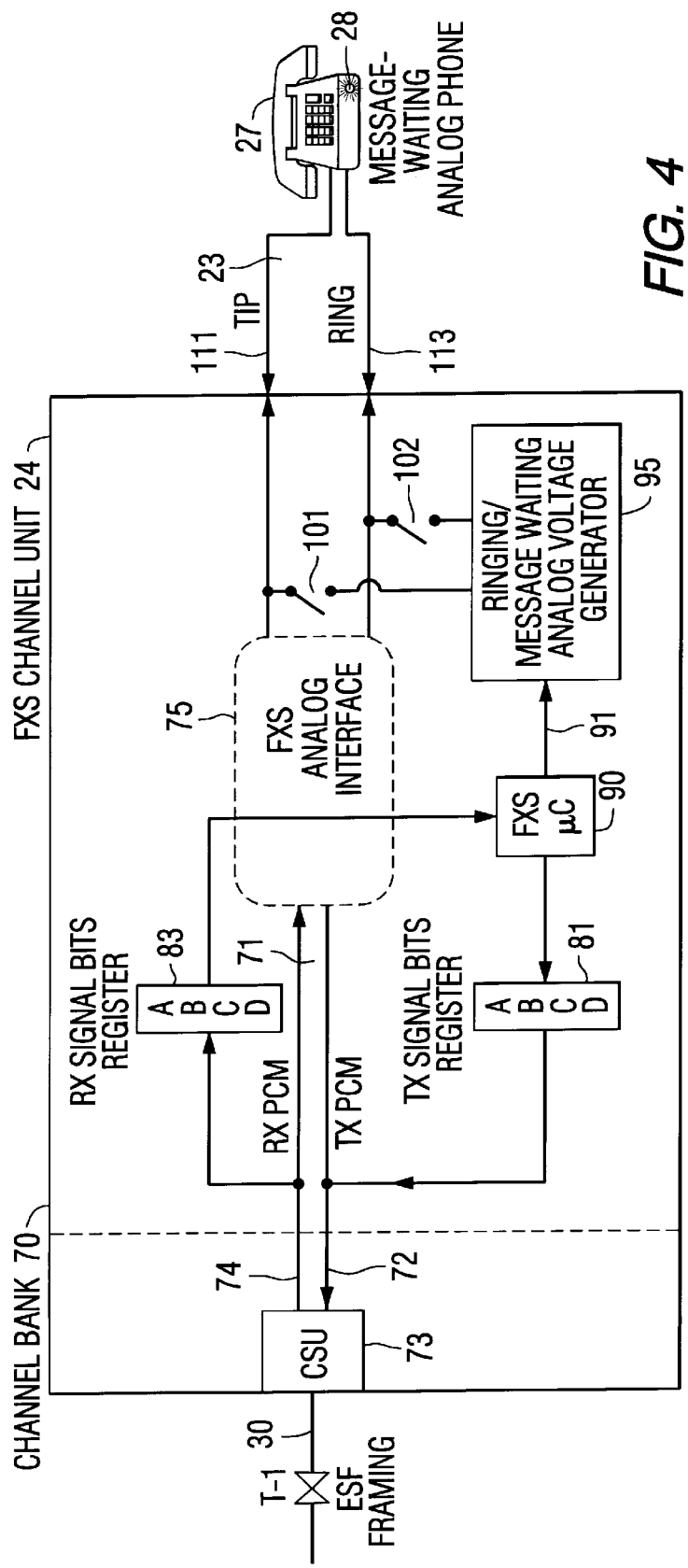

USE OF REDUNDANT BITS OF ESF DATA STREAM TO TRANSPORT MESSAGE-WAITING SIGNALLING OVER FXO/FXS T-1 DIGITAL LINK

FIELD OF THE INVENTION

The present invention relates in general to communication systems and is particularly directed to a mechanism for controlling the operation of a telephone message-waiting light of a foreign exchange subscriber circuit, by usurping redundant signalling bits of extended superframe format time division multiplexed digital communication signals transported over a (T-1) digital communication link to the foreign exchange subscriber circuit from a foreign exchange office, in order to transport a request to assert a message-waiting light driving signal at the foreign exchange subscriber circuit.

BACKGROUND OF THE INVENTION

A common technique for extending voice services over a digital communication link involves terminating opposite ends of the link with a foreign exchange office (FXO) and foreign exchange subscriber (FXS) circuit, so that station lines from a private branch exchange (PBX) or key telephone system may be extended to a distant location. One of the features offered by many PBX systems, such as those commonly used in places of business and at hotel/motel locations, is the ability to controllably illuminate a telephone message-waiting light to alert the customer to a voice mail message.

When telephone station lines are to be extended over a digital communication link, such as a T-1 data rate link, using an FXO/FXS channel unit combination, the customary mechanism for energizing a message-waiting light has involved the use of frequency shift keyed (FSK) signaling, such as described, for example, in Bellcore document TA-NWT-001401, issue 1, and US WEST document 77335, issue A. Unfortunately, this conventional approach requires the installation of a modem at each end of the link for encoding and decoding the FSK signal, entailing an unacceptable cost.

SUMMARY OF THE INVENTION

In accordance with the present invention, the desire to controllably activate an analog signalling device, such as a message-waiting light of a telephone unit of a PBX system, that is coupled over a two-wire link to a foreign exchange subscriber circuit terminating a digital communication link, such as a T-1 link, without the cost problems associated with FSK signalling, described above, is successfully achieved by hardware and software modifications to each of the FXO and FXS channel units at opposite ends of the digital communication link, for usurping a portion of the redundant signalling bits of extended superframe format time division multiplexed digital communication signals that are conveyed over the link, to transport a prescribed request code, that instructs the FXS circuit to generate a prescribed analog output, such as asserting a message-waiting light driving signal on the two-wire (tip-ring) pair to the message-waiting phone.

In accordance with the hardware modification of the FXO channel unit, a tip and ring line PBX station line pair is coupled to an FXO analog interface and to a message-waiting voltage detection circuit. The FXO analog interface performs PCM/analog conversion and PCM/analog signalling between the PBX station line pair and a transmit/receive PCM path coupled to a channel services unit terminating the FXO end of the digital link.

The message-waiting voltage detection circuit serves to detect a voltage in excess of a prescribed value (e.g., 100 volts) across the tip and ring pair from the PBX, whether it be due to a message-waiting voltage asserted or a ringing signal voltage. In response to this prescribed voltage, the output of the detection circuit changes state, which is analyzed by the FXO channel unit's microcontroller, to determine whether the voltage stimulus is a ringing voltage signal or a message-waiting voltage. Transmit and receive signalling bit registers coupled to the transmit/receive PCM path store the four signalling bits (A,B,C,D) of the extended superframe time division multiplex signalling format employed by the digital link.

In accordance with customary ESF framing format, for voice channel signalling the A and B signalling bits are repeated in the C and D signalling bit positions, so that the information conveyed by the C and D bits is redundant. For FXO/FXS signalling protocol, in the absence of the application of a ringing voltage, each of the A and C bits is set to a '0' and each of the B and D bits is set to a '1'. Pursuant to the invention, in order to indicate that a message-waiting voltage has been asserted by the PBX, the redundant C and D bit pair is selectively 'robbed' and used to convey a prescribed digital code. In particular, the FXO channel unit's microcontroller changes the D bit to a '0', so that the CD bit pair is converted to the code '00'.

The FXS channel unit at the far end of the T-1 link examines the state of the C and D bits of the robbed pair, to determine whether a message waiting voltage is to be applied over the two-wire analog link to the subscriber's telephone unit equipped with an analog signal based auxiliary class of service, such as an analog voltage-driven, message-waiting light. The FXS channel unit is part of a larger system, which includes a channel services unit that terminates the T-1 link and is interfaced with an FXS analog interface. The FXS analog interface performs PCM/analog conversion and PCM/analog signalling between an analog line pair to the subscriber telephone unit and a transmit/receive PCM path coupled to the channel services unit. The FXS channel unit's transmit and receive signalling bit registers store the four signalling bits (A,B,C,D) of the extended superframe time division multiplex signalling format employed by the digital link, and are coupled to the FXS channel unit's microcontroller and to transmit and receive links of the PCM path.

In the receive direction from the digital link, the FXS channel unit's microcontroller reads the contents of the receive signalling bit register and couples an output over a control line to a ringing signal/message-waiting analog voltage generator. The analog voltage generator is coupled through relay switches to the tip and ring lines of the analog line pair to the subscriber's telephone unit. If an analog ringing voltage signal is to be asserted onto the tip and ring lines to the subscriber's telephone unit, the ringing voltage signal is coupled through closed contacts of relay switches and applied to the tip and ring pair during an initial two second 'ringing' period, which is succeeded by a four second interval of no-ringing.

During this four second, no ringing interval, if a '0' has been asserted in the 'robbed' D bit position by the FXO channel unit at the far end of the digital link, the FXS channel unit's microcontroller will supply an output signal to the analog voltage generator, causing the application of a message waiting voltage at a fixed cadence (e.g., a pair of half-second flashes during the four second quiet period of the six second ringing interval) to the subscriber's telephone unit, so as to illuminate the message waiting light.

BRIEF DESCRIPTION OF THE DRAWINGS

FIG. 3 is a logic state diagram showing states of the A,B,C,D signalling bits of an extended superframe multiplexed data stream; and FIG. 4 diagrammatically illustrates the manner in which the FXS channel unit of FIG. 2 is modified to selectively assert a message waiting voltage over the tip and ring pair to a subscriber's telephone unit in accordance with the contents of the C and D signalling bits of the ESF format of the multiplexed data stream transmitted over a T-1 digital link.

DETAILED DESCRIPTION

Figure 1:
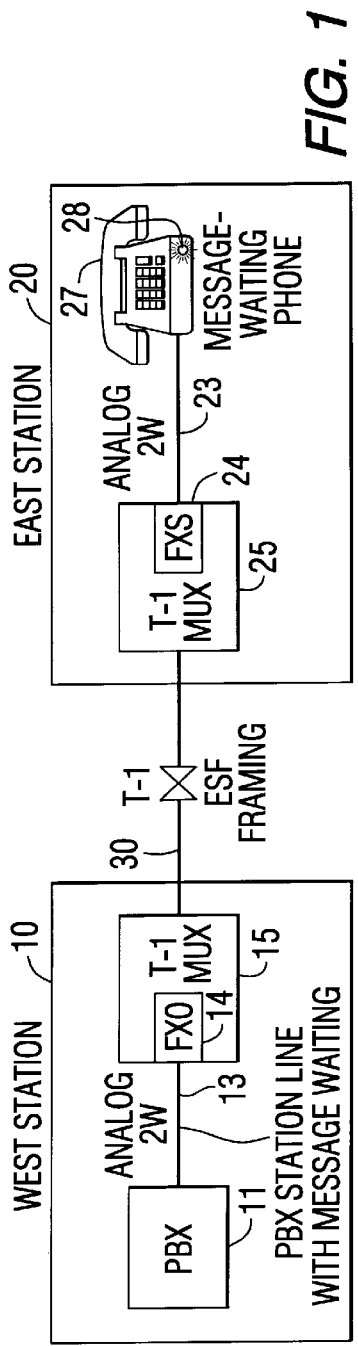
FIG. 1 is a simplified diagrammatic illustration of a digital communication system employing the telephone message-waiting light control mechanism of the present invention.

Before describing in detail the new and improved digital link based telephone message-waiting light control mechanism in accordance with the present invention, it should be observed that the invention resides primarily in what is effectively a prescribed arrangement of conventional communication circuits and associated digital signal processing components and attendant supervisory control circuitry therefor, that controls the operations of such circuits and components. Consequently, the configuration of such circuits components and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the system in a convenient functional grouping, whereby the present invention may be more readily understood.

Referring now to FIG. 1, a simplified diagrammatic illustration of a digital communication system employing the telephone message-waiting light control mechanism of the present invention is shown as comprising a 'west' station 10 and an 'east' station 20 installed at opposite ends of a time division multiplex digital communication link, such as a T-1 data rate link 30 that employs extended superframe multiplexing format. 'West' station 10 contains a PBX 11 connected by way of a two-wire analog link 13 to an FXO channel unit 14 of a T-1 multiplexer 15, which terminates the west end of the T-1 link 30. In a complementary fashion, the 'east' station 20 contains a T-1 multiplexer 25 terminating the east end of the T-1 link 30. T-1 multiplexer 25 contains an FXS channel unit 24 which terminates a two-wire analog pair 23 to a subscriber's telephone unit 27 that is equipped with an analog signal-based, auxiliary class of service device, such as an analog voltage-driven, message-waiting light 28.

As pointed out above, in order to provide message-waiting services from the PBX 11 to the subscriber's phone 27, it has been conventional practice to employ industry-defined FSK signaling, mandating installation of a modem at each location for encoding and decoding the FSK signal. In accordance with the invention, however, by incorporating minor hardware and software modifications to each of the FXO and FXS channel units 14 and 24, respectively, advantage is taken of the redundancy of the signalling bits of the extended superframe format of the time division multiplexed digital communication signals that are transported over the T-1 link 30, to convey a prescribed digital code from the FXO channel unit that instructs the FXS channel unit circuit 24 at the subscriber's end of the T-1 link to assert a message-waiting light driving signal on the two-wire (tip-ring) pair 23 to the message-waiting phone 27.

Figure 2:
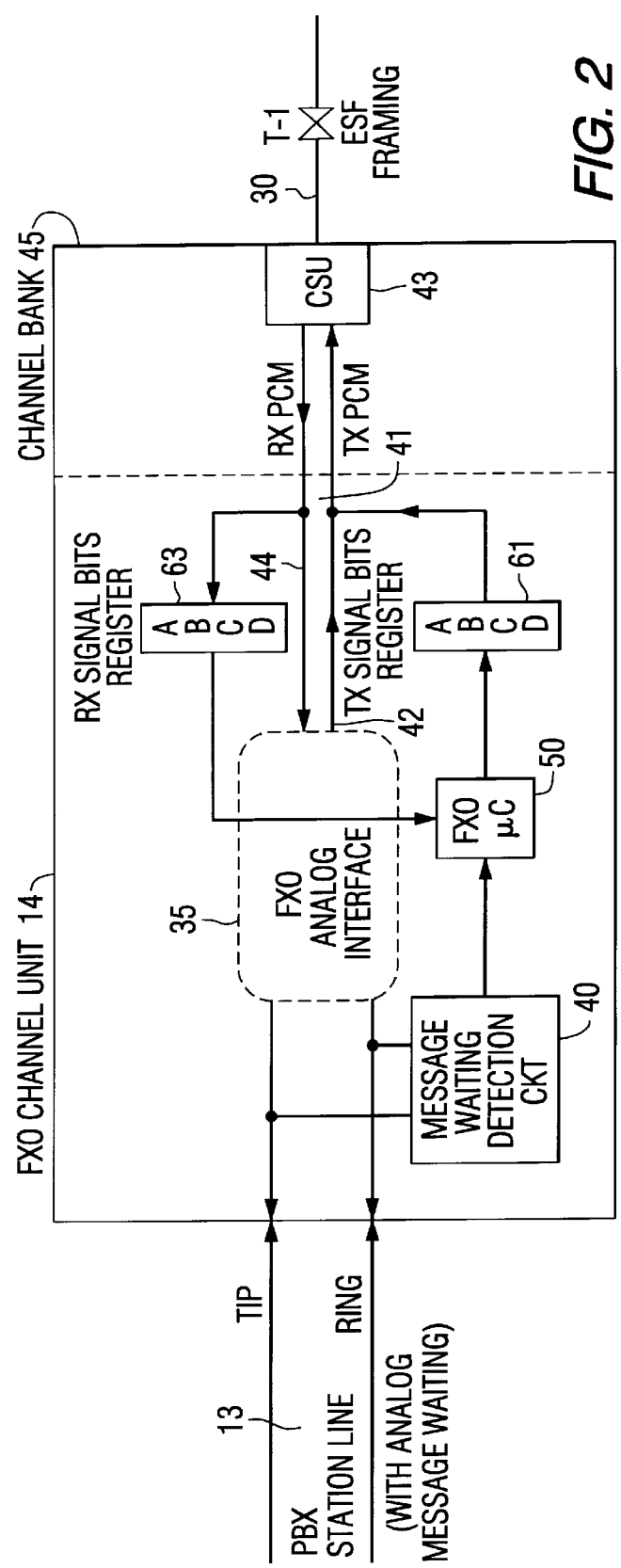
FIG. 2 diagrammatically illustrates the manner in which an FXO channel unit is modified to incorporate the signalling bit usurping mechanism of the present invention for transporting message-waiting signalling information from a PBX to a subscriber phone unit at the far end of a digital (T-1) link.

The manner in which the FXO channel unit 14 is modified to incorporate the signalling bit usurping mechanism of the present invention for transporting such message-waiting signalling information from a PBX to a subscriber phone unit at the far end of a digital (T-1) link is diagrammatically illustrated in FIG. 2. As shown therein, a tip and ring line PBX station line pair 13 is coupled to an FXO analog interface 35 of the FXO channel unit 14, and to a threshold voltage detection circuit 40. FXO analog interface 35 is of a conventional configuration and is operative to perform customary PCM/analog conversion and PCM/analog signalling between PBX station line pair 13 and a transmit/receive PCM path 41, which is coupled to a channel services unit (CSU) 43 of a channel bank 45 terminating the west end of T-1 digital link 30.

The threshold voltage detection circuit 40 may be comprised of an opto-coupled threshold detector and bridge circuit, and is operative to detect a voltage in excess of a prescribed value (e.g., 100 volts) across the tip and ring pair 13. In response to detecting such a prescribed voltage, whether it be due to a message-waiting voltage or a ringing signal voltage, the output of the threshold voltage detection circuit 40 changes state. The output of the threshold voltage detection circuit is analyzed by the FXO channel unit's microcontroller 50, to determine whether the voltage stimulus is a ringing voltage signal or a message-waiting voltage.

Also shown in FIG. 2 are FXO channel unit's transmit and receive signalling bit registers 61 and 63, which are respectively coupled to the transmit and receive links 42 and 44 of the transmit/receive PCM path 41, and serve to store the four signalling bits (A,B,C,D) of extended superframe time division multiplex signalling format employed by the T-1 link 30. In accordance with ESF framing format, for voice channels, the A and B signalling bits are repeated in the C and D signalling bit positions, so that the information conveyed by the C and D bits is redundant. For conventional FXO/FXS signalling protocol, in the absence of the application of a ringing voltage, each of the A and C bits is set to a '0' and each of the B and D bits is set to a '1', as illustrated in the logic state diagram of FIG. 3.

Pursuant to the invention, in order to indicate that a message-waiting voltage has been asserted on the tip and ring pair 13 by the PBX, the C and D bit pair is selectively 'robbed' and used to convey a prescribed digital code. In particular, in response to determining that the output of threshold detection circuit 40 is representative of the application of a message-waiting voltage, microcontroller 50 changes the D bit to a '0', as shown in FIG. 3. As will be described, where the FXS channel unit 24 at the 'east' end of the T-1 link has been configured for message waiting mode, it will examine the C and D bits (which would normally be ignored), to determine whether a message waiting voltage is to be applied over the two-wire analog link 23 to the subscriber's telephone unit 27 equipped with an analog signal based auxiliary class of service, such as an analog voltage-driven, message-waiting light 28.

FIG. 4 diagrammatically illustrates the manner in which the FXS channel unit 25 of FIG. 1 is modified to selectively assert a message waiting voltage over the tip and ring pair 23 to a subscriber's telephone unit 27, based upon the contents of the C and D signalling bits of the ESF format of the multiplexed data stream transmitted over the T-1 link 30. As shown therein, the east end of the T-1 link 30 is terminated by a channel services unit 73 of a channel bank 70, which is interfaced with an FXS analog interface 75. The FXS analog interface 75 is of conventional configuration and is operative to perform customary PCM/analog conversion and PCM/analog signalling between the analog line path 23 to the customer's telephone unit and a transmit/receive PCM path 71, which is coupled to the channel services unit 73. Also shown in FIG. 4 are the FXS channel unit's transmit and receive signalling bit registers 81 and 83, which store the four signalling bits (A,B,C,D) of the extended superframe time division multiplex signalling format employed by the T-1 link 30. The FXS channel unit's transmit and receive signalling bit registers 81 and 83 are coupled to the FXS channel unit's microcontroller 90 and are respectively coupled to the transmit and receive links 72 and 74 of the transmit/receive PCM path 71.

As described above, in the receive direction from the T-1 link 30, the FXS channel unit's microcontroller 90 reads the contents of receive signalling bit register 83. The output of microcontroller 90 is coupled over a control line 91 to a ringing signal, message waiting analog voltage generator 95. The analog voltage generator 95 is coupled through relay switches 101 and 102 to the tip and ring lines 111 and 113, respectively, of analog line pair 23 to the subscriber's telephone unit 27. Typically, the analog voltage generator 95 will serve a plurality of tip and ring pairs; the installation of the relay switches allows the microcontroller 90 to schedule the assertion of a message waiting voltage so as not to interfere with other lines.

If a ringing voltage signal is to be asserted onto the tip and ring lines 111 and 113 to the subscriber's telephone unit 27, the ringing voltage signal is coupled through closed contacts of relay switches 101 and 102. This voltage is applied to the tip and ring pair 23 during an initial two second 'ringing' period, which is succeeded by a four second interval of no-ringing. If a '0' has been asserted in the 'robbed' D bit position by the FXO channel unit at the far end of the T-1 link 30, the contents of the receive register 83 will be 0100, as shown in FIG. 3, then during this four second, 'no ringing' interval, the microcontroller 90 will generate an output signal over control line 91 to the analog voltage generator 95, causing the application of a message waiting (−150 VDC) voltage at a fixed cadence (e.g., a pair of half-second flashes during the four second quiet period of the six second ringing interval) over the two-wire analog link 23 to the subscriber's telephone unit 27, thereby illuminating the phone's message-waiting light 28.

As will be appreciated from the foregoing description, controlled activation of an analog signalling device, such as a message-waiting light of a telephone unit of a PBX system, that is coupled over a two-wire link to a foreign exchange subscriber circuit terminating a digital communication link is successfully achieved without the cost problems associated with FSK signalling, by hardware and software modifications to each of the FXO and FXS channel units at opposite ends of the digital communication link. These modifications are effective to usurp or rob redundant signalling bits of extended superframe format time division multiplexed digital communication signals to transport a prescribed request code, that instructs the FXS circuit to generate a message-waiting light driving signal on the two-wire (tip-ring) pair to the message-waiting phone.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. For use with a communication system having a digital communication path linking a first site with a second site, and wherein a signalling device that is driven by an analog driving signal is installed at said second site, a method of controlling the operation of said signalling device from said first site in response to the application of an analog signal thereto, comprising the steps of:

(a) in response to detecting the application of said analog signal to said first site, transporting information representative of said analog signal as redundant digitally encoded information signals conveyed from said first site to said second site to transport a digital code representative of a request to assert said analog driving signal at said second site, said redundant digitally encoded information signals being exclusive of signals of telephone signalling operations used to define a communication state of said digital communication path, so as not to interfere with said telephone signalling operations used to define said communication state of said digital communication path; and (b) in response to detecting said redundant digitally encoded information signals at said second site, decoding said digital code and generating said analog driving signal for operating said signalling device.

2. A method according to claim 1, wherein said redundant digitally encoded information signals comprise extended superframe format time division multiplexed digital communication signals having redundant signalling bits.

3. A method according to claim 1, wherein said signalling device comprises a telephone message-waiting indicator, and wherein said analog driving signal comprises a prescribed analog voltage for energizing said message waiting indicator.

4. A method according to claim 3, wherein step (b) comprises generating said analog driving signal for operating said telephone message-waiting indicator during a time that does not interfere with other telephone signalling operations.

5. A method according to claim 1, wherein said first site comprises a foreign exchange office and said second site comprises a foreign exchange subscriber circuit.

6. A method according to claim 5, wherein said digital communication path comprises a T-1 data rate digital communication link.

7. For use with a communication system having digital communication path linking a first site with a second site, and wherein a signalling device that is driven by an analog driving signal is installed at said second site, an arrangement for controlling the operation of said signalling device from said first site in response to the application of an analog signal thereto, comprising:

at said first site,
      a detector which is operative to detect application of said analog signal, and an encoder, responsive to the output of said detector, and being operative to encode information representative of said analog signal as redundant digitally encoded information signals conveyed over said digital communication path to said second site with a digital code representative of a request to assert said analog driving signal at said second site, said redundant digitally encoded information signals being exclusive of signals of telephone signalling operations used to define a communication state of said digital communication path, so as not to interfere with said telephone signalling operations used to define said communication state of said digital communication path; and at said second site, a decoder which is operative to decode said digital code in said redundant digitally encoded information signals conveyed from said first site, and an analog driving signal generator which is operative to supply said analog driving signal to said signalling device, in response to said decoder decoding said digital code.

8. An arrangement according to claim 7, wherein said redundant digitally encoded information signals comprise extended superframe format time division multiplexed digital communication signals having redundant signalling bits.

9. An arrangement according to claim 7, wherein said signalling device comprises a telephone message-waiting indicator, and wherein said analog driving signal comprises a prescribed analog voltage for energizing said message waiting indicator.

10. An arrangement according to claim 9, wherein said analog driving signal generator is operative to supply said message-waiting analog voltage to said message-waiting signalling device, during a time that does not interfere with other telephone signalling operations.

11. An arrangement according to claim 7, wherein said first site comprises a foreign exchange office and said second site comprises a foreign exchange subscriber circuit.

12. An arrangement according to claim 11, wherein said digital communication path comprises a T-1 data rate digital communication link.

13. For use with a telephone communication system having a time division multiplex digital communication path linking a first site with a second site, and wherein a message-waiting signalling device that is operated by an analog stimulus is installed at said second site, an arrangement for controlling the operation of said message-waiting signalling device from said first site, via said time division multiplex digital communication path, in response to the assertion of a message-waiting analog signal at said first site, comprising:

at said first site, a digital communications controller, responsive to assertion of said message-waiting analog signal, for encoding information representative of said message-waiting analog signal as redundant time division multiplex digital signals that are conveyed over said time division multiplex digital communication path from said first site to said second site, said redundant time division multiplex digital signals being exclusive of signals of telephone signalling operations used to define a communication state of said time division multiplex digital communication path, so as not to interfere with said telephone signalling operations used to define said communication state of said time division multiplex digital communication path; and at said second site, a message-waiting analog stimulus generator which is operative to supply said message-waiting stimulus to said message-waiting signalling device, in response to detecting said encoded information contained in said redundant time division multiplex digital signals conveyed over said time division multiplex digital communication path from said first site.

14. An arrangement according to claim 13, wherein said message-waiting analog stimulus generator operative to supply said message-waiting stimulus to said message-waiting signalling device, during a time that does not interfere with other telephone signalling operations.

15. An arrangement according to claim 13, wherein said redundant time division multiplex digital signals comprise extended superframe format time division multiplexed digital communication signals having redundant signalling bits.

16. An arrangement according to claim 15, wherein said first site comprises a foreign exchange office and said second site comprises a foreign exchange subscriber circuit.

17. An arrangement according to claim 16, wherein said time division multiplex digital communication path comprises a T-1 data rate digital communication link.

* * * * *